United States Patent
Vayntraub

(10) Patent No.: US 11,796,108 B1
(45) Date of Patent: Oct. 24, 2023

(54) QUICK RELEASE HOSE CONNECTOR

(71) Applicant: Vladimir Vayntraub, Fallbrook, CA (US)

(72) Inventor: Vladimir Vayntraub, Fallbrook, CA (US)

( * ) Notice: Subject to any disclaimer, the term of this patent is extended or adjusted under 35 U.S.C. 154(b) by 176 days.

(21) Appl. No.: 17/347,473

(22) Filed: Jun. 14, 2021

(51) Int. Cl.
*F16L 37/407* (2006.01)

(52) U.S. Cl.
CPC .................. *F16L 37/407* (2013.01)

(58) Field of Classification Search
CPC .................. F16L 37/407; F16L 37/33
See application file for complete search history.

(56) References Cited

U.S. PATENT DOCUMENTS

| | | | | |
|---|---|---|---|---|
| 1,859,018 A | * | 5/1932 | Bedford | F16L 37/407 251/149.6 |
| 2,598,009 A | * | 5/1952 | Peeps | F16L 37/248 285/379 |
| 4,193,576 A | * | 3/1980 | White | F16L 37/113 251/149.6 |
| 4,208,034 A | * | 6/1980 | Ohlsson | F16L 37/098 285/308 |
| 5,385,331 A | * | 1/1995 | Allread | F16L 37/407 251/149.6 |
| 5,520,665 A | * | 5/1996 | Fleetwood | A61M 39/26 604/905 |
| 5,823,438 A | * | 10/1998 | Holt | B05B 7/32 239/581.1 |
| 5,950,985 A | * | 9/1999 | Petterson | F16L 37/407 285/331 |
| 9,752,473 B1 | * | 9/2017 | Burns | F01M 11/0408 |
| 9,989,181 B2 | * | 6/2018 | Liu | F16L 37/407 |

FOREIGN PATENT DOCUMENTS

| | | | | |
|---|---|---|---|---|
| GB | | 408082 A | * | 1/1933 |
| GB | | 910429 A | * | 1/1961 |
| WO | WO-2021188074 A1 | | * | 9/2021 |

* cited by examiner

*Primary Examiner* — David Colon-Morales
(74) *Attorney, Agent, or Firm* — QUICKPATENTS, LLC; Kevin Prince

(57) ABSTRACT

A device for connecting a hose to a water source includes a first connector having a bore between a first and second ends. A spherical plug slides within the bore and includes a plurality of runners spaced around a perimeter of the spherical plug, a gap between each adjacent runner allowing water to flow from one side of the plug to the other through the bore. An elastomeric frustoconical seal is fixed proximate the second end of the bore and adapted to occlude the seal in a disconnected position of the device. A rigid second connector has a frustoconical standoff member adapted to contact the plug through the seal from the second end of the bore of the first connector and move it away from the seal as the second connector is inserted into the first connector, the device achieving a selectable connected position.

8 Claims, 8 Drawing Sheets

QUICK RELEASE HOSE CONNECTOR

CROSS-REFERENCE TO RELATED APPLICATIONS

Not applicable.

STATEMENT REGARDING FEDERALLY SPONSORED RESEARCH AND DEVELOPMENT

Not applicable.

FIELD OF THE INVENTION

This invention relates to hose connectors, and more particularly to a non-leaking hose connector.

SUMMARY OF THE INVENTION

The present device is a device for connecting a hose or other liquid conduit to a water source, such as a water spigot, additional hose or the like. It is understood that herein the term water source is most typically for liquid water, but could be used for any other liquid being transported within a conduit, pipe or hose, such as gasoline, as well as a gas such as air, or the like. A rigid first connector has at a first end thereof an attachment mechanism for connecting with the water source. The first connector includes a bore between the first end and a second opposing end through which the liquid or water may flow.

A rigid spherical plug is adapted for sliding within the bore of the first connector and includes a plurality of runners spaced around a perimeter of the spherical plug. The runners are all preferably aligned with the longitudinal axis of the bore so that the spherical plug travels within the bore only along the longitudinal axis of the bore. The runners have gaps therebetween for allowing water or other liquid to flow from one side of the plug to the other through the bore.

An elastomeric frustoconical seal is fixed proximate the second end of the bore with a clamping ring, or the like. The plug is adapted to occlude the seal when water pressure from the bore presses the plug into the seal in a disconnected position of the device. Pressure from the water source presses the plug into the seal firmly to prevent liquid from escaping around the plug or seal.

A rigid second connector has a frustoconical standoff member adapted to contact the plug through the seal from the second end of the bore of the first connector and move it away from the seal as the second connector is inserted into the first connector, the device achieving a connected position. The standoff member has at least one water passage around the seal. Water pressure from the water source presses the plug into the standoff member to prevent liquid from escaping between the seal and the standoff member.

An attachment mechanism is provided for allowing the first connector to be selectively fixed with the second connector in the connected position. The attachment mechanism includes an actuator for allowing the first and second connectors, to be mutually separated into the disconnected position upon actuation thereof. Such an attachment mechanism may include a retention ring that fits into a groove around the first connector and that is compressed into a cooperative groove around an inside surface of the second connector, so as to allow the two connectors, to be separated. Clearly other attachment mechanisms could be utilized for connecting two conduits together, as is known in the art.

The device is self-cleaning since the standoff scrapes along the inside surface of the seal as the second connector is brought into the first connector, and the plug and runners are free to rotate about the inside surface of the bore the runners to clean the inside surface of the bore. Further, the only moving part is the plug, which moves back and forth within the bore, keeping the complexity and number of moving parts relatively low. Water pressure from the water source serves to further seal the device when in either the connected or disconnected position, rending the device essentially leak proof. Further, the plug may also seal the bore at the first end of the first connector, making the device an effective backflow preventer. Further, it is relatively easy for a user to clean the device by not engaging the first and second connectors completely, letting water run out and spray the connectors. When pulling relatively hard on the hose, the connectors may dislodge but the structure of the connectors will remain intact. Backflow of water is also prevented naturally by the present invention, negating the need for additional back-flow preventing devices where required or desired.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
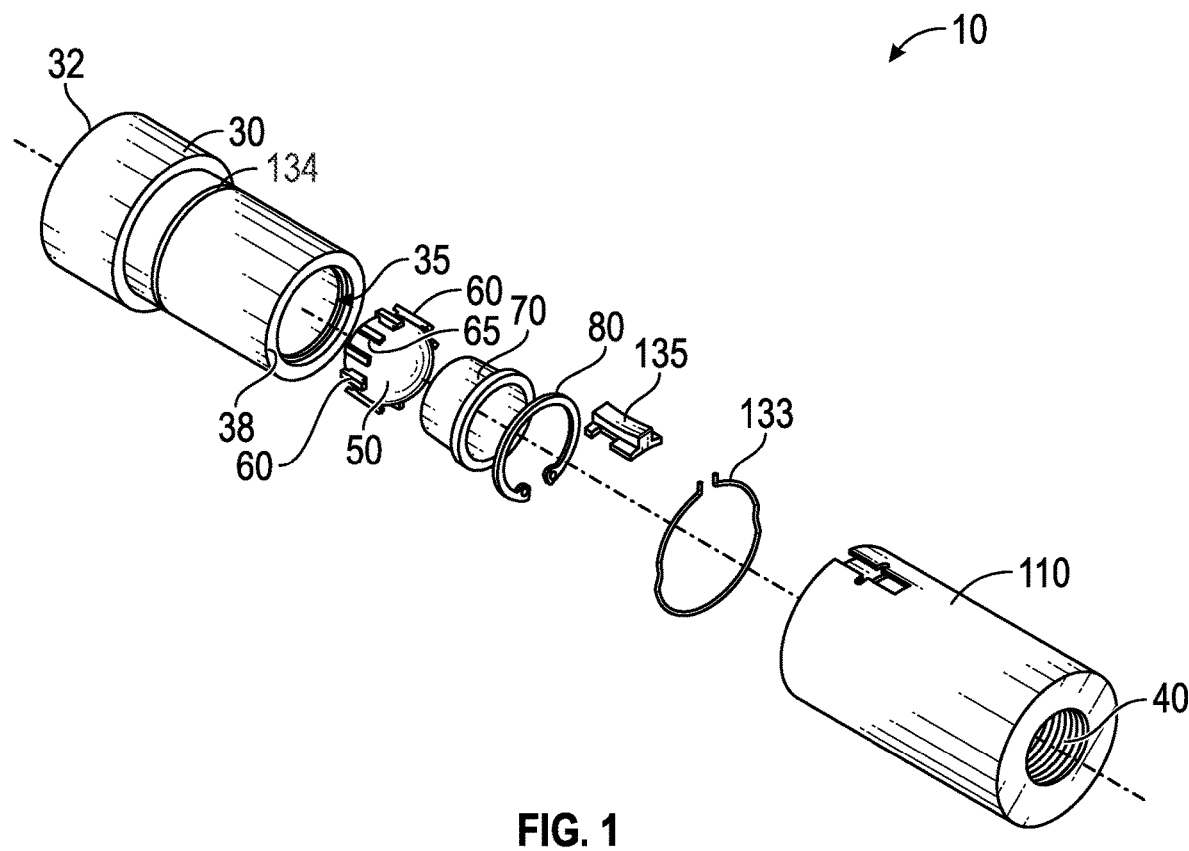
FIG. 1 is an exploded perspective view of a first and second connector of the invention, illustrated in a connected position.
Figure 2:
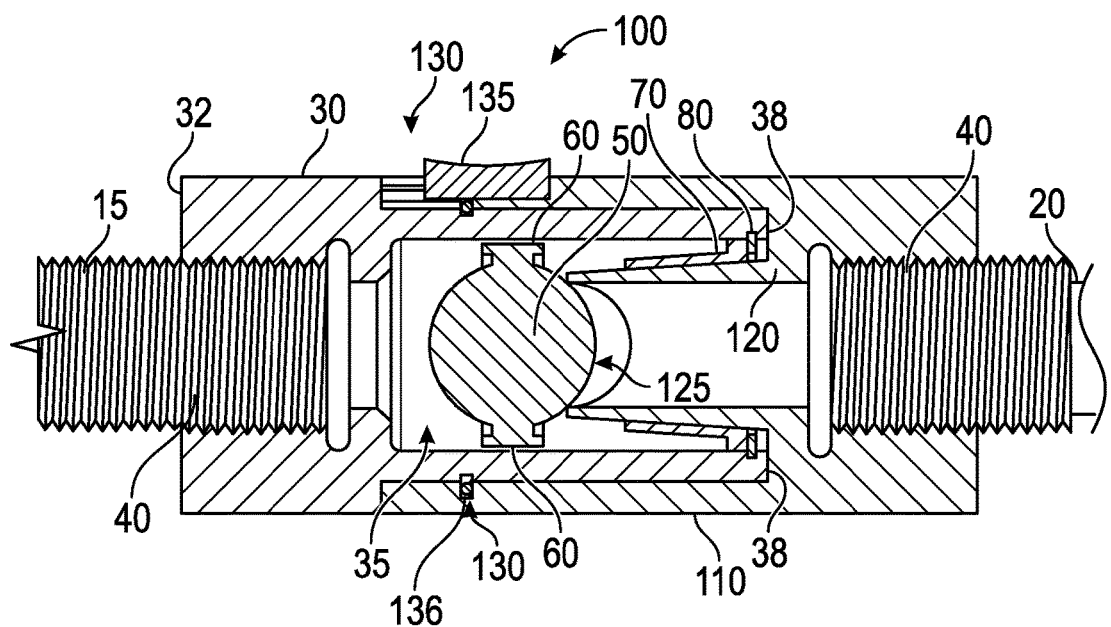
FIG. 2 is a cross-sectional view of the invention along a vertical plane through a longitudinal axis thereof.
Figure 3:
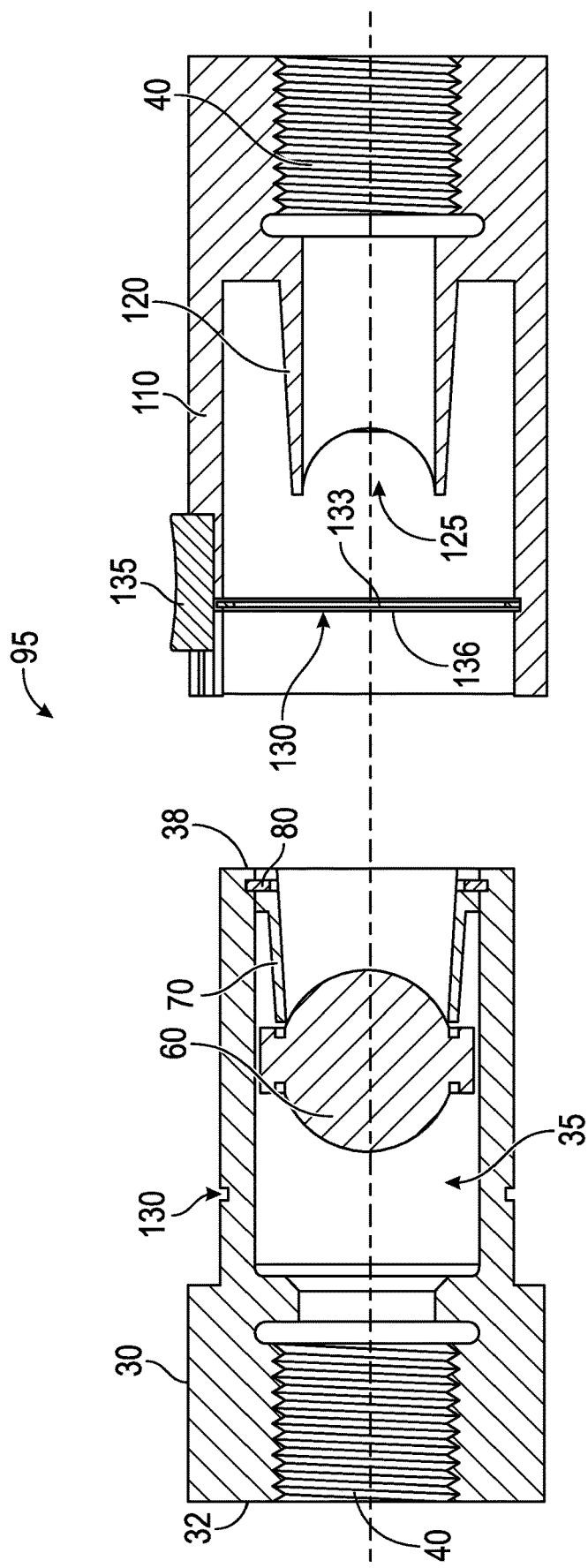
FIG. 3 is an exploded cross-sectional view of the invention in a disconnected position.
Figure 4:
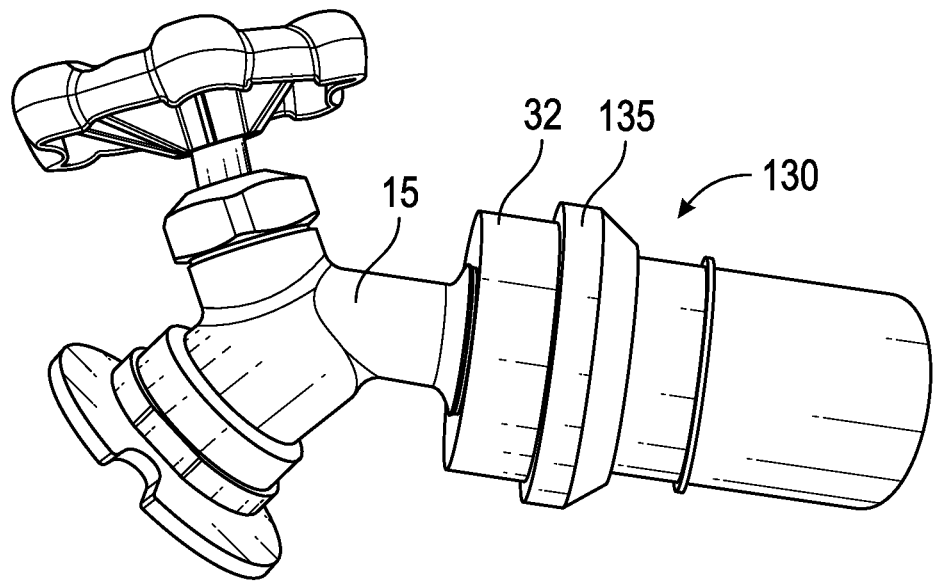
FIG. 4 is a partial side elevational view of an alternate attachment mechanism.
Figure 5:
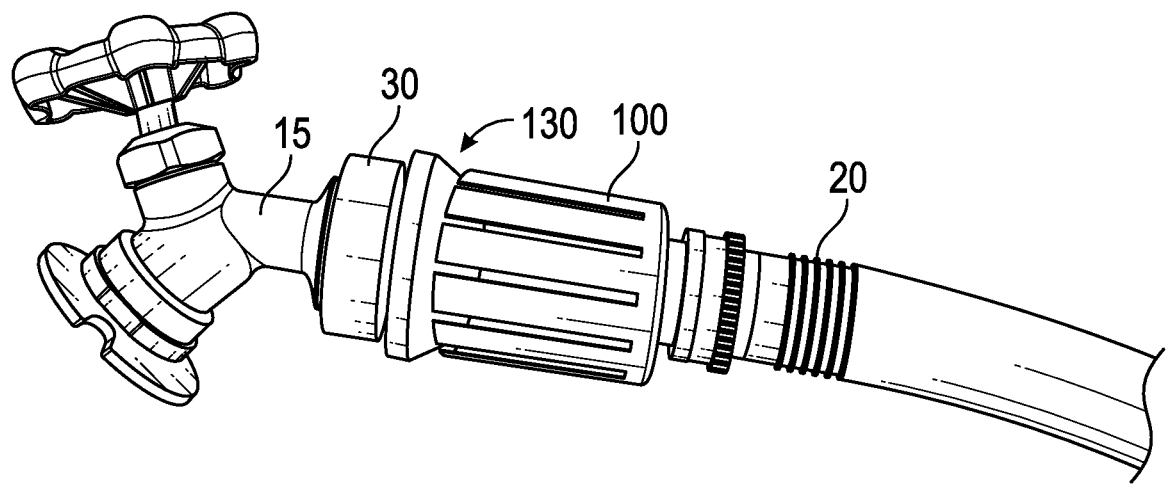
FIG. 5 is a side elevational view of the attachment mechanism of FIG. 4, further showing the second connector.

FIGS. 1-3 illustrate a device 10 for connecting a hose 20 or other liquid conduit to a water source 15, such as a water spigot, additional hose or the like. It is understood that herein the term water source 15 is most typically for liquid water, but could be used for any other liquid being transported within a conduit, pipe or hose. A rigid first connector 30 has at a first end 32 thereof an attachment mechanism 40 for connecting with the water source 15. The first connector 30 includes a bore 35 between the first end 32 and a second opposing end 38 through which the liquid or water may flow.

A spherical plug 50 is adapted for sliding within the bore 35 of the first connector 30 and in one embodiment may include a plurality of runners 60 spaced around a perimeter of the spherical plug 50. The runners 60 are all preferably aligned with the longitudinal axis of the bore 35 so that the spherical plug 50 travels within the bore 35 only along the longitudinal axis of the bore 35. The runners 60 have gaps 65 therebetween for allowing water or other liquid to flow from one side of the plug 50 to the other through the bore 35. Preferably the spherical plug 50 is made from a plastic, rubber, glass, or metal material.

An elastomeric frustoconical seal 70 is fixed proximate the second end 38 of the bore 35 with a clamping ring 80, or the like. The plug 50 is adapted to occlude the seal 70 when water pressure from the bore 35 presses the plug 50 into the seal 70 in a disconnected position 90 of the device. Pressure from the water source 15 presses the plug 50 into the seal 70 firmly to prevent liquid from escaping around the plug 50 or seal 70. Preferably the seal 70 is made from an elastomeric rubber material.

A rigid second connector 110 has a frustoconical standoff member 120 adapted to contact the plug 50 through the seal 70 from the second end 38 of the bore 35 of the first connector 30 and move it away from the seal 70 as the second connector 110 is inserted into the first connector 30, the device 10 achieving a connected position 100. The standoff member 120 has at least one water passage 125 around the seal 70. Water pressure from the water source 15 presses the plug 50 into the standoff member 120 to prevent liquid from escaping between the seal 70 and the standoff member 120.

An attachment mechanism 130 is provided for allowing the first connector 30 to be selectively fixed with the second connector 110 in the connected position 100. The attachment mechanism includes an actuator 135 for allowing the first and second connectors 30,100 to be mutually separated into the disconnected position 90 upon actuation thereof. Such an attachment mechanism 130 may include a retention ring 133 that fits into a groove 134 around the first connector 30 and that is compressed into a cooperative groove 136 around an inside surface of the second connector 110, so as to allow the two connectors 30,110 to be separated. Clearly other attachment mechanisms 130 can be utilized for connecting two cylindrical objects together, as is known in the art.

Figure 6:
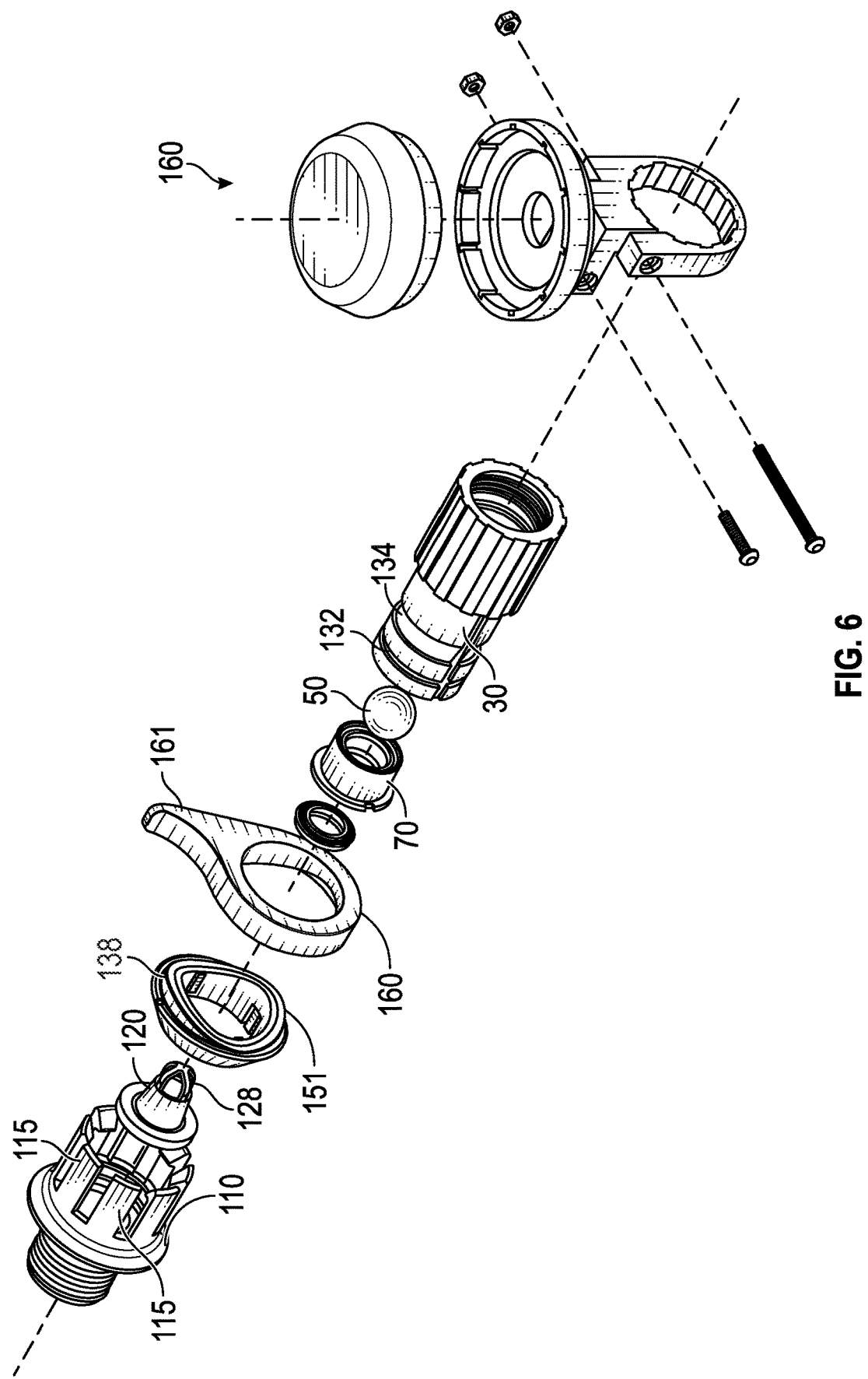
FIG. 6 is a perspective exploded view of a preferred embodiment of the invention.
Figure 8:
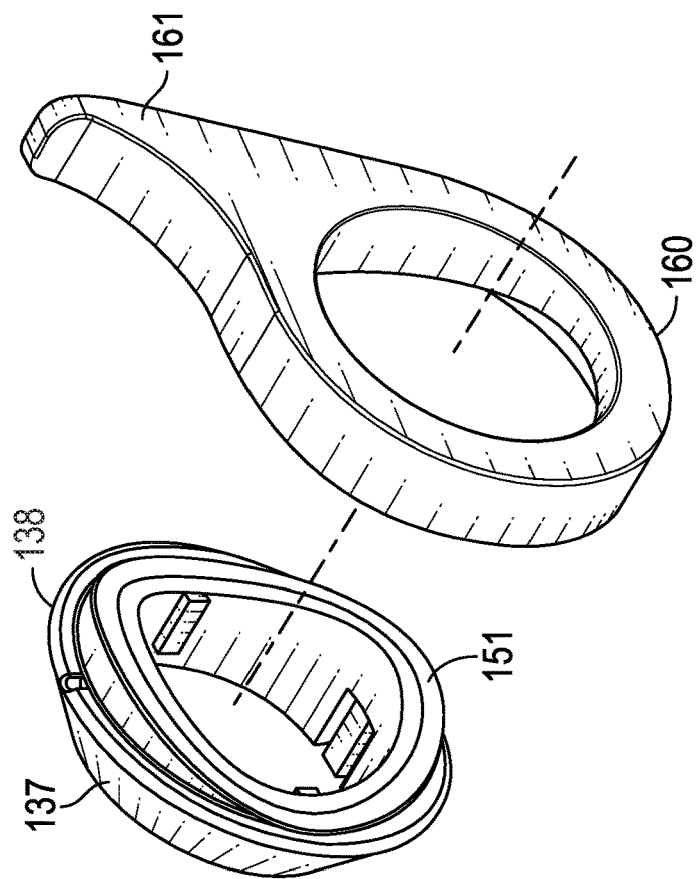
FIG. 8 is a partial rear perspective view of the actuator of the embodiment of FIG. 6.
Figure 7:
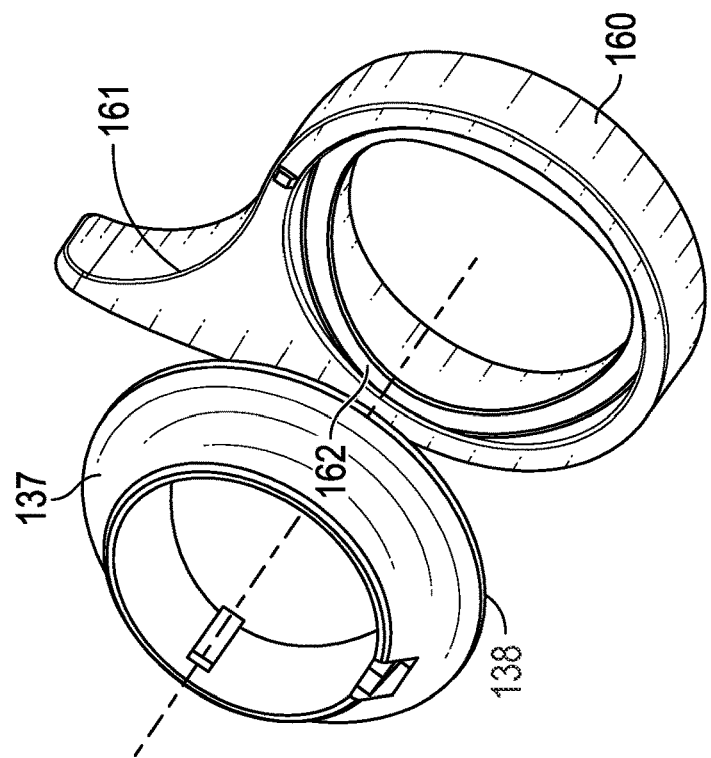
FIG. 7 is a partial front perspective view of an actuator of the embodiment of FIG. 6.
Figure 9:
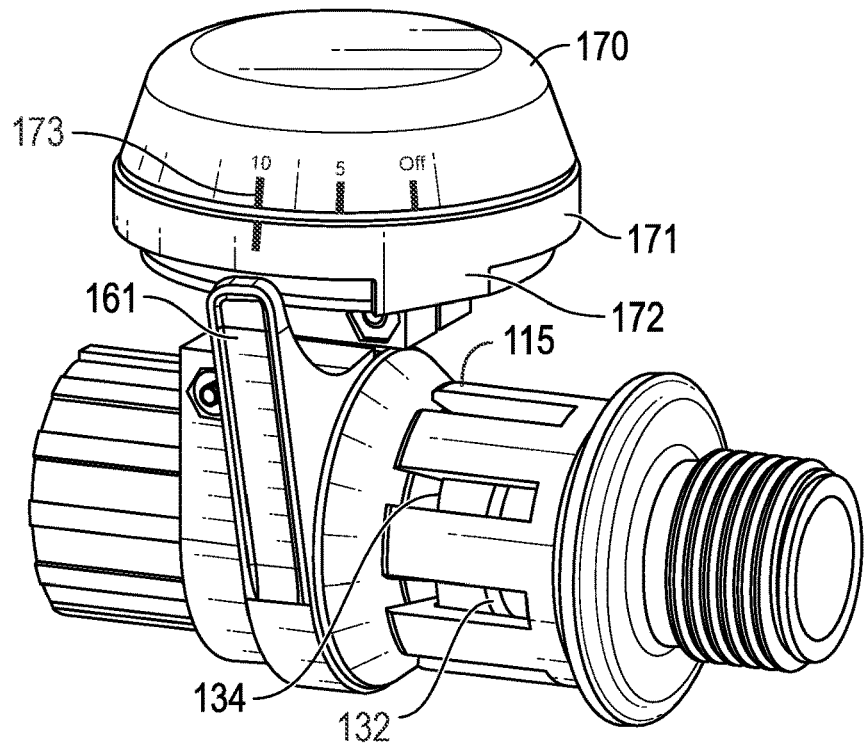
FIG. 9 is a perspective view of the embodiment of FIG. 6, shown in a connected position.

In alternate preferred embodiments of the invention, a plurality of spacers 128 (FIG. 6) extend away from the standoff member 120 to contain the spherical plug 50 in a preferred central location when the device is in the connected position 100, water being able to flow around the spherical plug 50 without dislodging the spherical plug 50 from the preferred central location.

Figure 10:
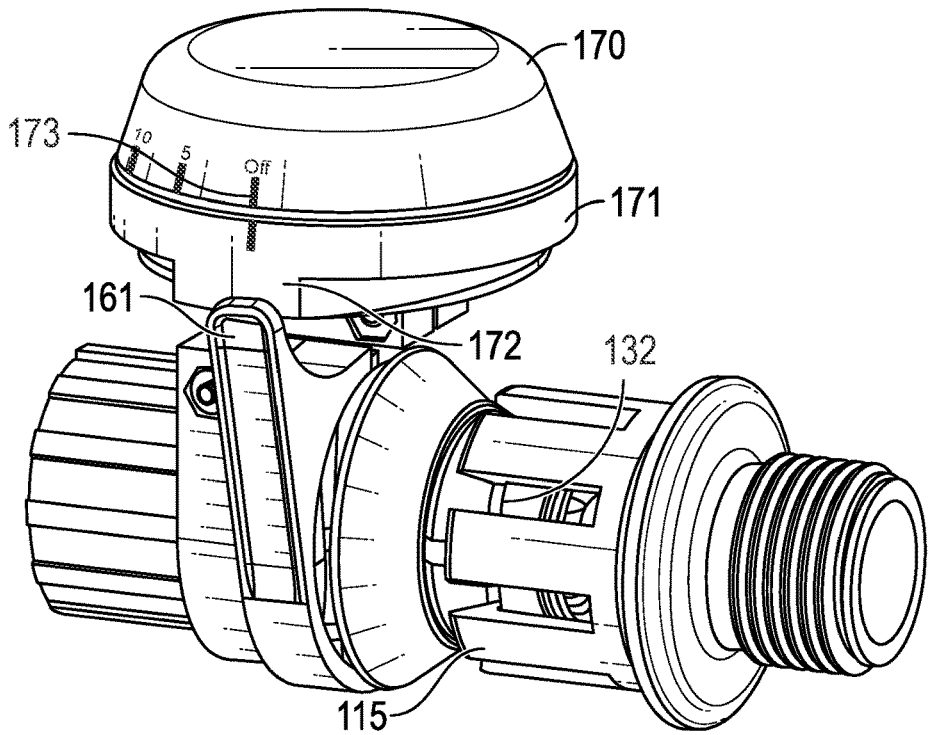
FIG. 10 is a perspective view of the embodiment of FIG. 6, shown in a disconnected position.
Figure 11:
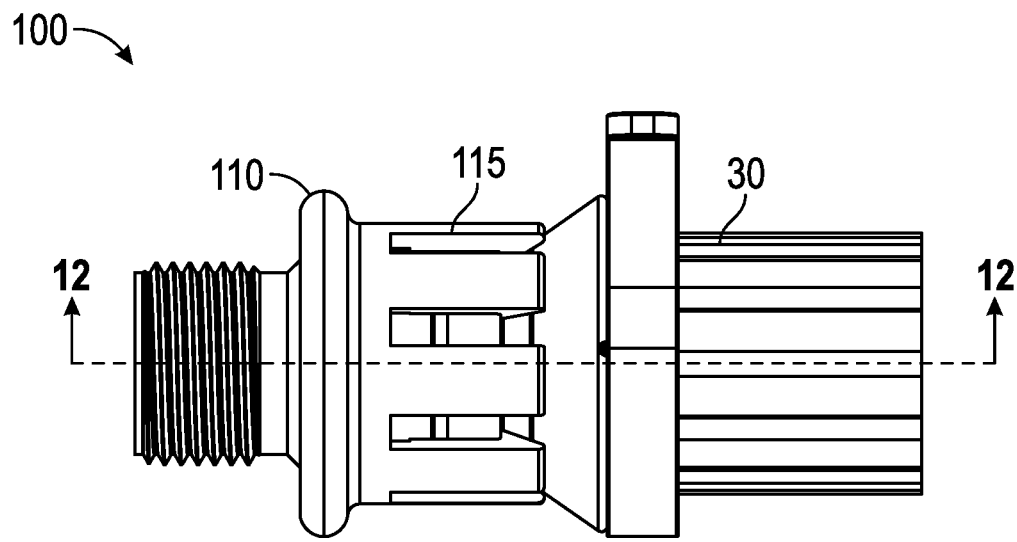
FIG. 11 is an elevational view of the embodiment of FIG. 6, shown in a connected position.
Figure 12:
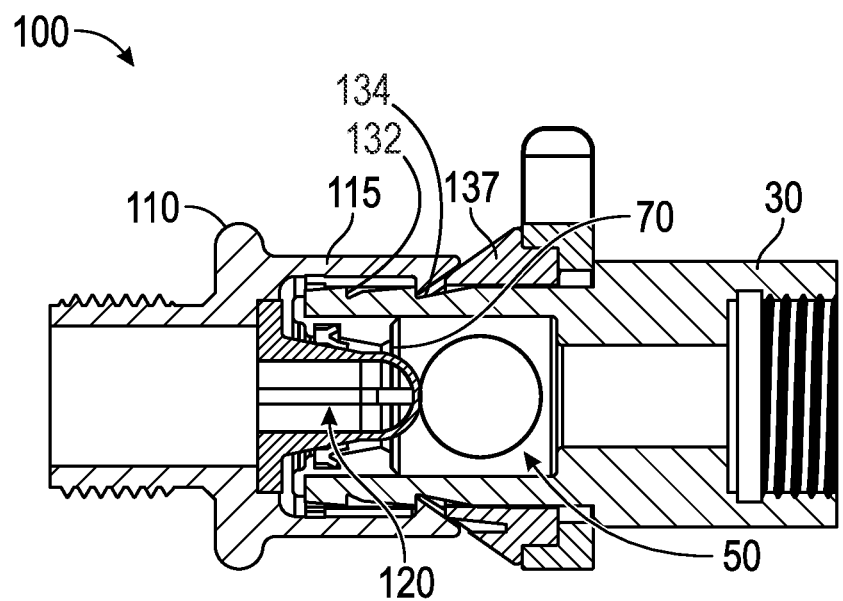
FIG. 12 is a cross-sectional view of the embodiment of FIG. 6, taken along lines 12-12 of FIG. 11.
Figure 13:
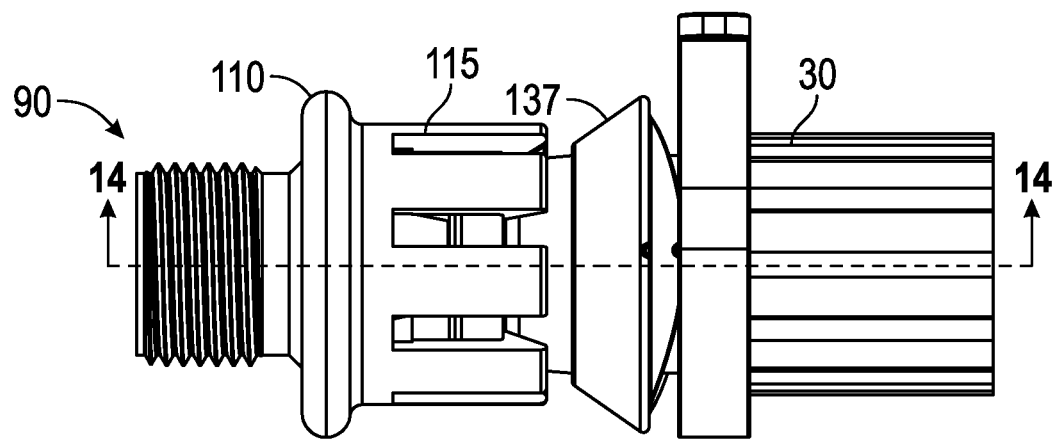
FIG. 13 is an elevational view of the embodiment of FIG. 6, shown in a disconnected position.
Figure 14:
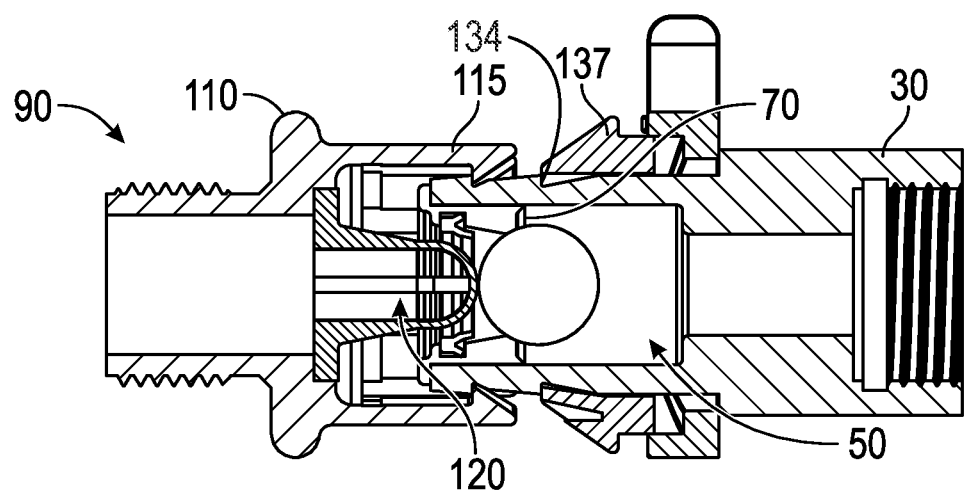
FIG. 14 is a cross-sectional view of the embodiment of FIG. 6, taken along lines 14-14 of FIG. 11.

In preferred embodiments, illustrated in FIGS. 4-10, the attachment mechanism 130 includes the actuator 135 as a ring 138 having an angled surface 137 that, when pressed into a plurality of longitudinal resilient fingers 115, forces each of the resilient fingers away from the groove 134 of the first connector 30 (FIGS. 9-14) to allow the removal of the second connector 110 from the first connector 30. In some such embodiments, the actuator 135 is a lever 161 (FIGS. 6-10) that cooperates with the ring 138 at an undulating ring pair 151,162 that, when abutting mutually rotate, oscillate between a retracted position (FIGS. 9, 11, and 12) and an extended position (FIGS. 10, 13, and 14). When the lever 161 is actuated the angled surface 137 is forced into the resilient fingers 115 of the second connector 110 to separate the resilient fingers 115 from the groove 134, thereby forcing the second connector 110 away from the first connector 30 and into the disconnected configuration 90. The resilient fingers 115 then snap into a secondary grove 134. As such, in the disconnected configuration 90 the first connector 30 and the second connector 110 remain mechanically connected but fluidly disconnected, whereas in the connected configuration 100 the first connector 30 and the second connector 110 are both mechanically and fluidly connected. A completely disengaged configuration 95 (FIG. 3) provides for the first connector 30 and the second connector 110 to be completely mechanically and fluidly disengaged from each other. Advantageously, in the disconnected configuration 90, the first connector 30 and the second connector 110 may be quickly pushed together into the connected configuration 100 to fluidly connect the first connector 30 and the second connector 110, without having to be concerned about aligning the first connector 30 with the second connector 110 since the first connector 30 and the second connector 110 in the disconnected configuration 90 are already mechanically mutually engaged.

In embodiments of the invention that include a timer having a timer mechanism 170 (FIGS. 6-10), a timing ring 171 is rotated to a desired time mark 173, the timer mechanism 170 over the designated time mark 173 rotating the timing ring 171 back to an original position wherein a projection 172 of the timing ring 171 actuates the lever 161 to move the separate the second connector 110 from the first connector 30, shutting off the flow of water through the device 10. To restart the flow of water through the device for a subsequent period of time, the timing ring 171 is rotated to the desired time mark 173 and the first connector 30 is pressed towards the second connector 110, whereby the process repeats. Preferably the timer mechanism 170 includes a coil spring (not shown) or an electronic timing circuit (not shown) fixed with a motorized gearing arrangement (not shown) adapted to rotate the timing ring 171 to actuate the lever 161. Preferably the timer mechanism 170 is removable (FIG. 6) such that the timer mechanism 170 may be sold separately if desired.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device for connecting a hose to a water source, the device comprising:
    a rigid first connector having at a first end thereof an attachment mechanism for connecting with the water source, the first connector including a bore between the first end and a second end;
    a spherical plug adapted for sliding within the bore of the first connector;
    an elastomeric frustoconical seal fixed proximate the second end of the bore with a clamping ring, the plug adapted to occlude the seal when water pressure from the bore presses the plug into the seal in a disconnected position of the device;
    a rigid second connector having a frustoconical standoff member adapted to contact the plug through the seal from the second end of the bore of the first connector and move it away from the seal as the second connector is inserted into the first connector into a connected position of the device, the standoff member having at least one water passage around the seal; and
    an attachment mechanism for allowing the first connector to be selectively fixed with the second connector in the connected position, the attachment mechanism including an actuator for allowing the first and second connectors to be mutually separated into the disconnected position.

2. The device of claim 1 wherein the spherical plug includes a plurality of runners spaced around a perimeter of the spherical plug and all mutually longitudinally aligned with the bore, the runners having a plurality of gaps therebetween for allowing the water to flow from one side of the plug to the other through the bore.

3. The device of claim 1 wherein a plurality of spacers extend away from the standoff member to contain the spherical plug in a preferred central location when the device is in the connected position.

4. The device of claim 1 wherein the attachment mechanism includes a retention ring that fits into a groove around the first connector and that is compressed into a cooperative groove around an inside surface of the second connector, so as to allow the two connectors to be separated to put the device into the disconnected position.

5. The device of claim 1 wherein the actuator includes a lever that cooperates with a ring at an undulating ring pair that, when abutting and mutually rotated, oscillate between a retracted position and an extended position, such that when the lever is actuated from a first position to a second position, an angled surface of the ring is forced into a plurality of resilient fingers of the second connector to separate the resilient fingers from the groove, thereby forcing the second connector away from the first connector, the resilient fingers then engaging a secondary grove.

6. The device of the claim 5 further including a timer fixed with the first connector and disposed adjacent the lever, the timer including a base, a circular rotating ring, and a timer mechanism disposed between the base and the rotating ring and adapted to rotate the ring with respect to the base at a predetermined rate, the rotating ring including a lever engaging surface at a first inside radius about a first arc and continuously graduating to a second outside radius about a remaining arc, the lever when engaging the lever engaging surface at the first inside radius positionable in the first position with the device in the connected position, and when engaging the lever engaging surface at the second outside radius being moved to the second position, placing the device in the disconnected position.

7. The device of claim 6 wherein the timing mechanism is a mechanical, coil-spring-based mechanism.

8. The device of claim 6 wherein the timing mechanism is an electronic timing circuit fixed with a motorized gearing arrangement adapted to rotate the rotating ring.

* * * * *